US011989434B1

(12) United States Patent
Creed et al.

(10) Patent No.: US 11,989,434 B1
(45) Date of Patent: May 21, 2024

(54) OPTIMIZING PROTECTION OF HIGHLY DEDUPED DATA FOR PERFORMANCE AND AVAILABILITY

(71) Applicant: Dell Products L.P., Hopkinton, MA (US)

(72) Inventors: John Creed, Innishannon (IE); Owen Martin, Hopedale, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/194,710

(22) Filed: Apr. 3, 2023

(51) Int. Cl.
*G06F 3/06* (2006.01)

(52) U.S. Cl.
CPC .......... *G06F 3/0641* (2013.01); *G06F 3/0608* (2013.01); *G06F 3/0619* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 2012/0159098 A1* | 6/2012 | Cheung | G06F 12/0261 711/170 |
| 2017/0177266 A1* | 6/2017 | Doerner | G06F 3/0689 |
| 2018/0150485 A1* | 5/2018 | Tripathy | G06F 16/1748 |
| 2021/0286726 A1* | 9/2021 | Kucherov | G06F 12/0811 |

OTHER PUBLICATIONS

M. Lu, F. Wang, D. Feng, and Y. Hu. 2019. A Read-leveling Data Distribution Scheme for Promoting Read Performance in SSDs with Deduplication. In Proceedings of the 48th International Conference on Parallel Processing (ICPP '19). Association for Computing Machinery, New York, NY, USA, Article 22, 1-10. (Year: 2019).*
J. Bae, J. Park, Y. Jun, and E. Seo. 2022. Dedup-for-speed: storing duplications in fast programming mode for enhanced read performance. In Proceedings of the 15th ACM International Conference on Systems and Storage (SYSTOR '22). Association for Computing Machinery, New York, NY, USA, 128-139. (Year: 2022).*
Bo Mao, Hong Jiang, Suzhen Wu, Yinjin Fu, and Lei Tian. 2014. Read-Performance Optimization for Deduplication-Based Storage Systems in the Cloud. ACM Trans. Storage 10, 2, Article 6 (Mar. 2014), 22 pages. (Year: 2014).*

\* cited by examiner

*Primary Examiner* — Edward J Dudek, Jr.
*Assistant Examiner* — Ralph A Verderamo, III
(74) *Attorney, Agent, or Firm* — Anderson Gorecki LLP

(57) ABSTRACT

In a data storage system that includes two or more storage engines in interconnected by a channel-based fabric, highly deduplicated data is identified and promoted to a dedupe performance tier characterized by mirrors on each of the storage engines. Blocks of deduplication data are scored based on reference counts and read-miss access patterns. Promotion of blocks to the dedupe performance tier and demotion of blocks from the dedupe performance tier are calculated based on the scores. Performance is enhanced by enabling highly deduplicated blocks to be accessed from engine-local memory and engine-local storage via switches rather than the channel-based fabric.

20 Claims, 4 Drawing Sheets

US 11,989,434 B1

OPTIMIZING PROTECTION OF HIGHLY DEDUPED DATA FOR PERFORMANCE AND AVAILABILITY

TECHNICAL FIELD

The subject matter of this disclosure is generally related to data storage systems.

BACKGROUND

Organizational data storage systems are designed to maintain storage objects that contain data used by instances of host applications that run on host servers. Examples of host applications may include, but are not limited to, software for email, accounting, manufacturing, inventory control, and a wide variety of other organizational processes. Each storage object is a logical storage drive that abstracts the storage capacity of arrays of physical drives. A separate storage object or group of storage objects is typically created to store all data for a single host application. The storage capacity of the drives is organized into redundant array of independent disks (RAID) protection groups to help avoid data loss. A RAID protection group helps to avoid data loss by enabling a failed protection group member to be rebuilt using the remaining non-failed members. A RAID (D+P) protection group has D data members and P parity members. The data members store data. The parity members store non-data parity information such as XORs of the data values on the data members. In the event that a data member fails, the parity information is used with the non-failed data members to reconstruct the failed data member. A failed parity member can be reconstructed from the data members. A variety of different RAID levels with different numbers, types, and configurations of members are known, some of which can recover from simultaneous failure of multiple members. A typical data storage system includes multiple RAID protection groups of the same level.

SUMMARY

In accordance with some implementations, a method comprises configuring a portion of storage capacity of each of a plurality of storage engines as a dedupe performance tier; identifying highly deduplicated blocks of data according to predetermined criteria; and storing copies of the highly deduplicated blocks of data on the dedupe performance tier of each of the plurality of storage engines.

In accordance with some implementations, an apparatus comprises a data storage system comprising a plurality of storage engines configured to allocate portions of storage capacity as a dedupe performance tier, identify highly deduplicated blocks of data according to predetermined criteria, and store copies of the highly deduplicated blocks of data on the dedupe performance tier of each of the plurality of storage engines.

In accordance with some implementations, a non-transitory computer-readable storage medium stores instructions that when executed by compute nodes cause a data storage system to perform a method comprising: configuring a portion of storage capacity of each of a plurality of storage engines as a dedupe performance tier; identifying highly deduplicated blocks of data according to predetermined criteria; and storing copies of the highly deduplicated blocks of data on the dedupe performance tier of each of the plurality of storage engines.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
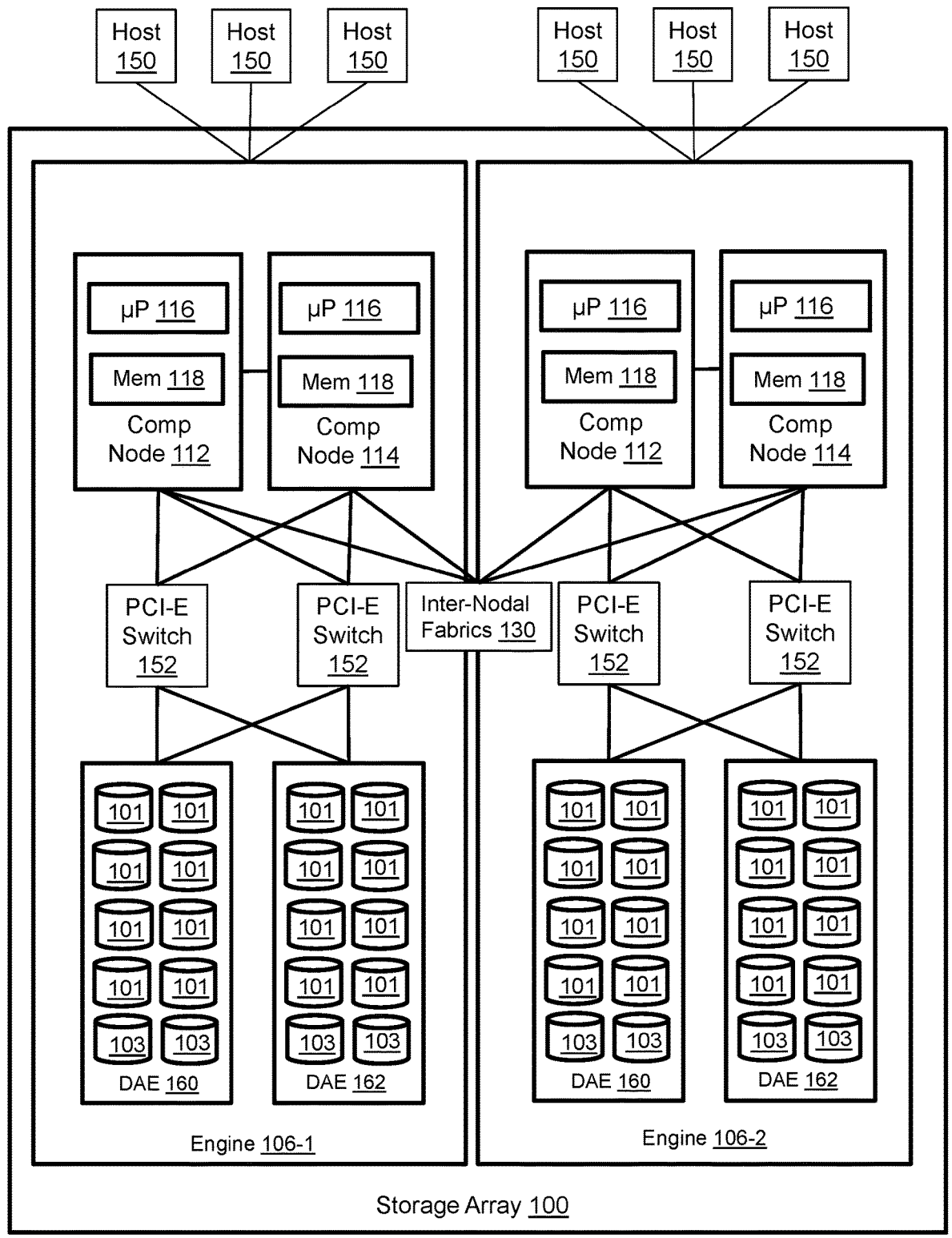
FIG. 1 illustrates a storage array with a dedupe performance tier.

FIG. 1 illustrates a storage array with a dedupe performance tier (DPT). The storage array 100 is shown with two engines 106-1, 106-2, but might include any number of engines. Each engine includes disk array enclosures (DAEs) 160, 162 and a pair of peripheral component interconnect express (PCI-e) interconnected compute nodes 112, 114 (aka storage directors) in a failover relationship. Within each engine, the compute nodes and DAEs are interconnected via redundant PCI-E switches 152. Each DAE includes managed drives 101, 103 that are non-volatile storage media that may be of any type, e.g., solid-state drives (SSDs) based on nonvolatile memory express (NVMe) and EEPROM technology such as NAND and NOR flash memory. Drives 103 are associated with the DPT, whereas drives 101 are not associated with the DPT. Each compute node is implemented as a separate printed circuit board and includes resources such as at least one multi-core processor 116 and local memory 118. The processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing input-output commands (IOs) from the host servers. Each compute node also includes one or more adapters for communicating with other compute nodes via redundant inter-nodal channel-based Infiniband fabrics 130.

Figure 2:
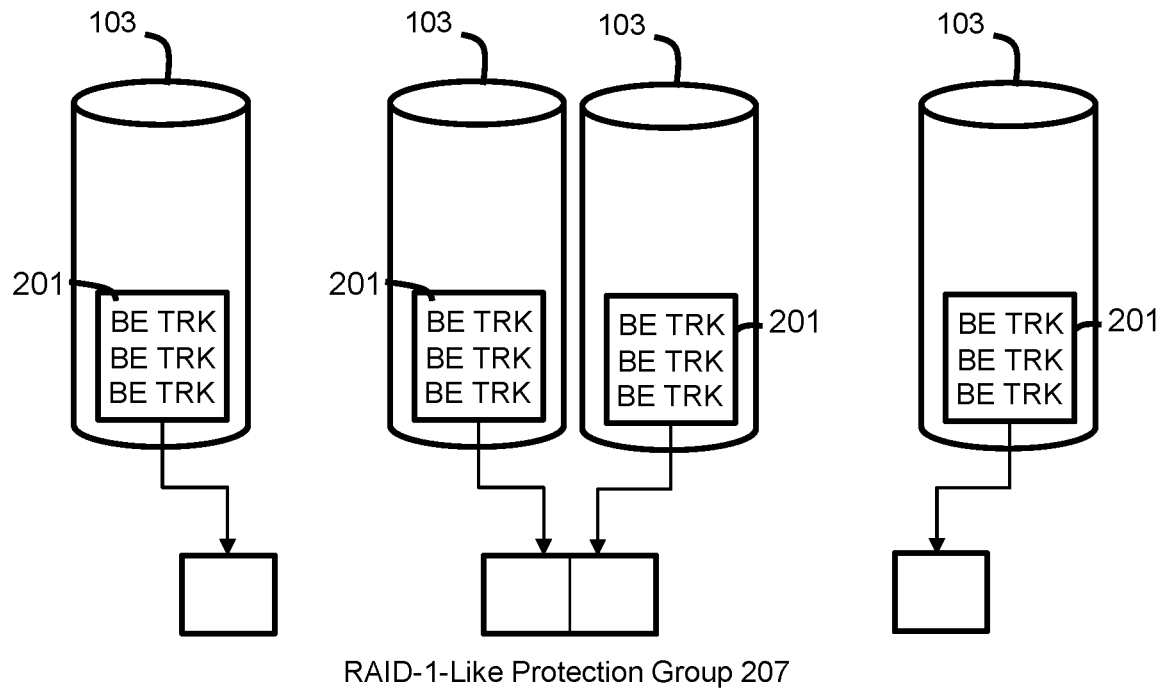
FIG. 2 illustrates the relationship between managed drives of the dedupe performance tier and storage objects.
Figure 2:
Figure 2:
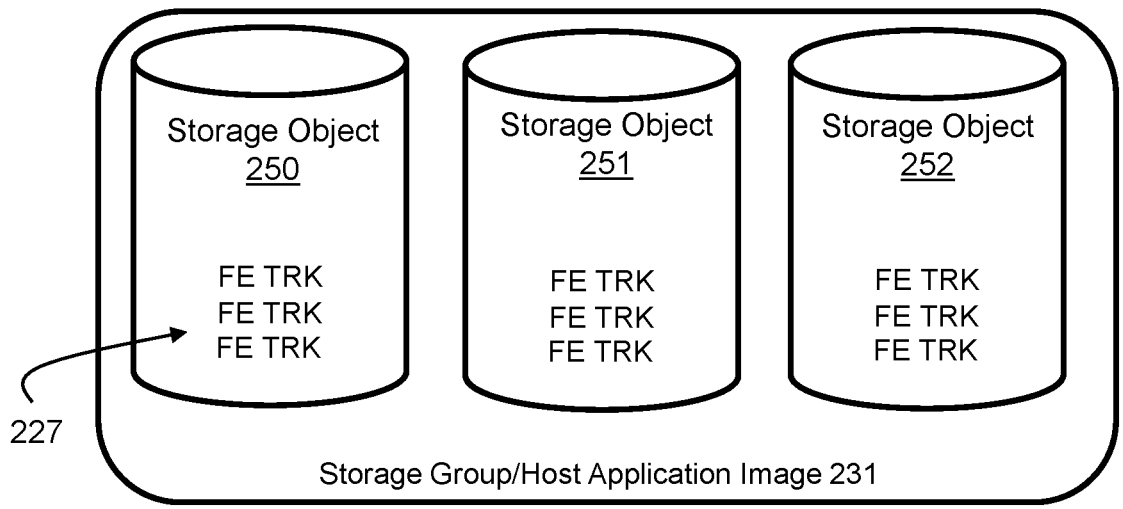

Referring to FIGS. 1 and 2, data associated with instances of the host applications running on the host servers 150 is maintained on the managed drives 101, 103. The managed drives are not discoverable by the host servers, so the storage array creates logical production storage objects 250, 251, 252 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers 150, each production storage object is a single disk drive having a set of contiguous fixed-size logical block addresses (LBAs) on which data used by the instances of one of the host applications resides. However, the host application data is stored at non-contiguous addresses on various managed drives 101, 103.

IO services emulations running on the processors of the compute nodes maintain metadata that maps between the LBAs of the production storage objects 250, 251, 252 and physical addresses on the managed drives 101, 103 in order to process IOs from the host servers. The basic allocation unit of storage capacity that is used by the compute nodes 112, 114 to access the managed drives is a back-end track (BE TRK). The managed drives are organized into same-size splits 201, each of which may contain multiple BE TRKs. Although individual drives can be configured as RAID group members, in the illustrated example a grouping of splits 201 from different managed drives is used to create a RAID protection group 207 with each split containing a protection group member. Specifically, splits from drives 101 are used to create RAID protection groups that include parity, such as RAID-5 or RAID-6, whereas splits from drives 103 are used to create RAID-1 or RAID-1-like data mirrors of highly duplicated data. A storage resource pool 205 is a type of storage object that includes a collection of protection groups of the same RAID level, e.g., RAID-5 (3+1) or RAID-1, on thinly provisioned logical data devices (TDATs) 265 that are used to create the production storage objects 250, 251, 252. The host application data is logically stored in front-end tracks (FE TRKs) on the production storage objects. The FE TRKs of the production storage objects are mapped to the BE TRKs on the managed drives and vice versa by tables and pointers that are maintained in the shared memory. A storage group 231 contains multiple production storage objects associated with an individual host application.

Figure 3:
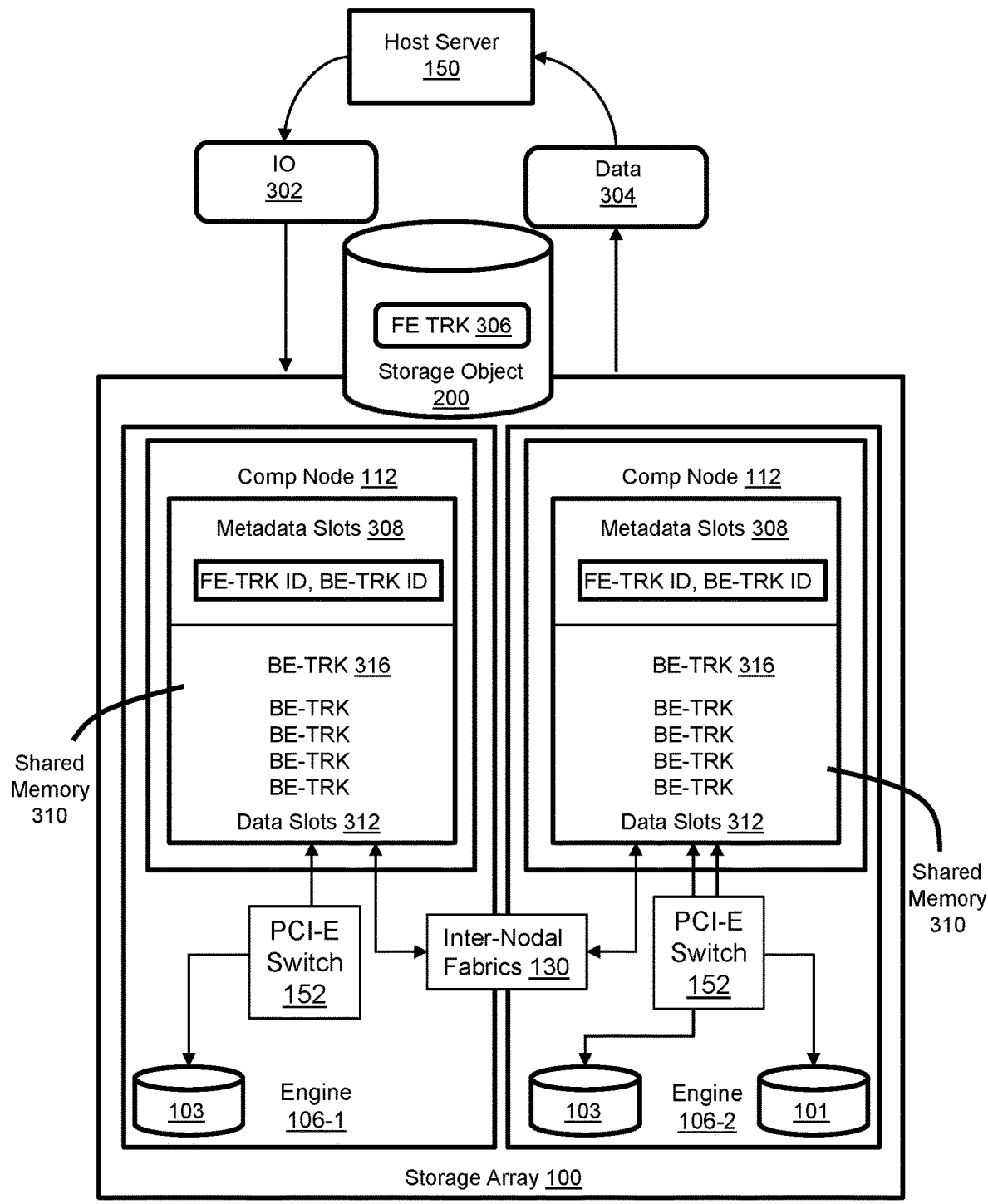
FIG. 3 illustrates aspects of data access in greater detail.

Referring to FIG. 3, the shared memory (aka shared cache) 310 includes metadata slots 308 and data slots 312, each of which includes fixed allocations of the local memory of the compute nodes. The FE-TRKs are mapped to the BE-TRKs and vice versa by FE-TRK IDs and BE-TRK IDs, which are pointers that are maintained in the metadata slots 308. More specifically, the BE-TRK IDs are pointers to BE-TRKs of host application data in the data slots. In the illustrated example, compute node 112 of engine 106-1 receives an IO 302 from host server 150 designating storage object 200 as the target of a read to access data 304. The compute node 112 of engine 106-1 uses information in the IO 302 to identify a metadata page corresponding to FE-TRK 306, e.g., by inputting information such as the storage object ID and LBAs into a hash table. The hash table indicates the location of the corresponding metadata page in the metadata slots 308. The metadata page indicates the location of the data, which may be in the shared memory or the managed drives, either local or remote relative to compute node 112 of engine 106-1.

The case in which the data 304 is present in the shared memory when the IO 302 is received is referred to as a "read-hit" or "cache-hit." A BE-TRK ID pointer from the identified metadata page is obtained and used by the compute node 112 to find the corresponding data slot that contains BE-TRK 316 which is associated with FE-TRK 306. If the data 304 is present in the local memory of compute node 112 of engine 106-1, then the data can be accessed with very low latency because the local memory is on the same printed circuit board as the processor running the IO services emulation servicing the IO 302. If the data 304 is present in local memory of a different compute node such as compute node 112 of engine 106-2, then the data can be accessed with somewhat greater latency by using remote direct memory access (RDMA) via the inter-nodal fabrics 130.

The case in which the data 304 is not present in the shared memory when the IO 302 is received is referred to as a "read-miss" or "cache-miss." A BE-TRK ID pointer from the identified metadata page is obtained and used by the compute node 112 to find the corresponding location of BE-TRK 316 which is associated with FE-TRK 306. If the BE-TRK 316 is present on a managed drive within the same engine as the compute node, then the data 304 can be accessed and copied into local shared memory with relatively low latency via a PCI-E switch 152. If the data BE-TRK 316 is not present on a managed drive within the same engine as the compute node, then the data 304 can be accessed and copied into local shared memory with relatively greater latency via the redundant inter-nodal fabrics 130. Specifically, the data would be accessed from managed drive 101 of engine 106-2 by the compute node of engine 106-2 and subsequently accessed by the compute node of engine 106-1 using RDMA.

The DPT is characterized by RAID-1 and RAID-1-like mirroring of highly deduplicated data to reduce read misses and accesses via the inter-nodal fabrics. Blocks of data are hashed, and the resulting hashes are used to identify duplicate blocks. The blocks may correspond to BE-TRKs, splits, or some other unit of allocation. Blocks with relatively few duplications may be replaced by pointers to single instances of the duplicated blocks stored on a non-DPT tier. Single instance mirrors of blocks with many duplications are stored in the DPT to enhance performance and availability. RAID-1 and RAID-1-like mirroring enables highly deduplicated data to be accessed in parallel from multiple drives 103. Moreover, the mirrors that contain copies of highly deduplicated blocks may be distributed across the engines such that one copy of each highly deduplicated block is stored on a local drive of each engine. In the case in which there are only two engines, there are two copies of the DPT data in a RAID-1 configuration distributed across the engines. In the case in which there are more than two engines, there are more than two copies of the DPT data distributed across more than two engines, which is RAID-1-like. The DPT improves performance by enabling the highly deduplicated data to be accessed from local memory or from a local drive via a PCI-E switch rather than via the inter-nodal fabrics using RDMA, regardless of which compute node receives the IO to read the data.

Figure 4:
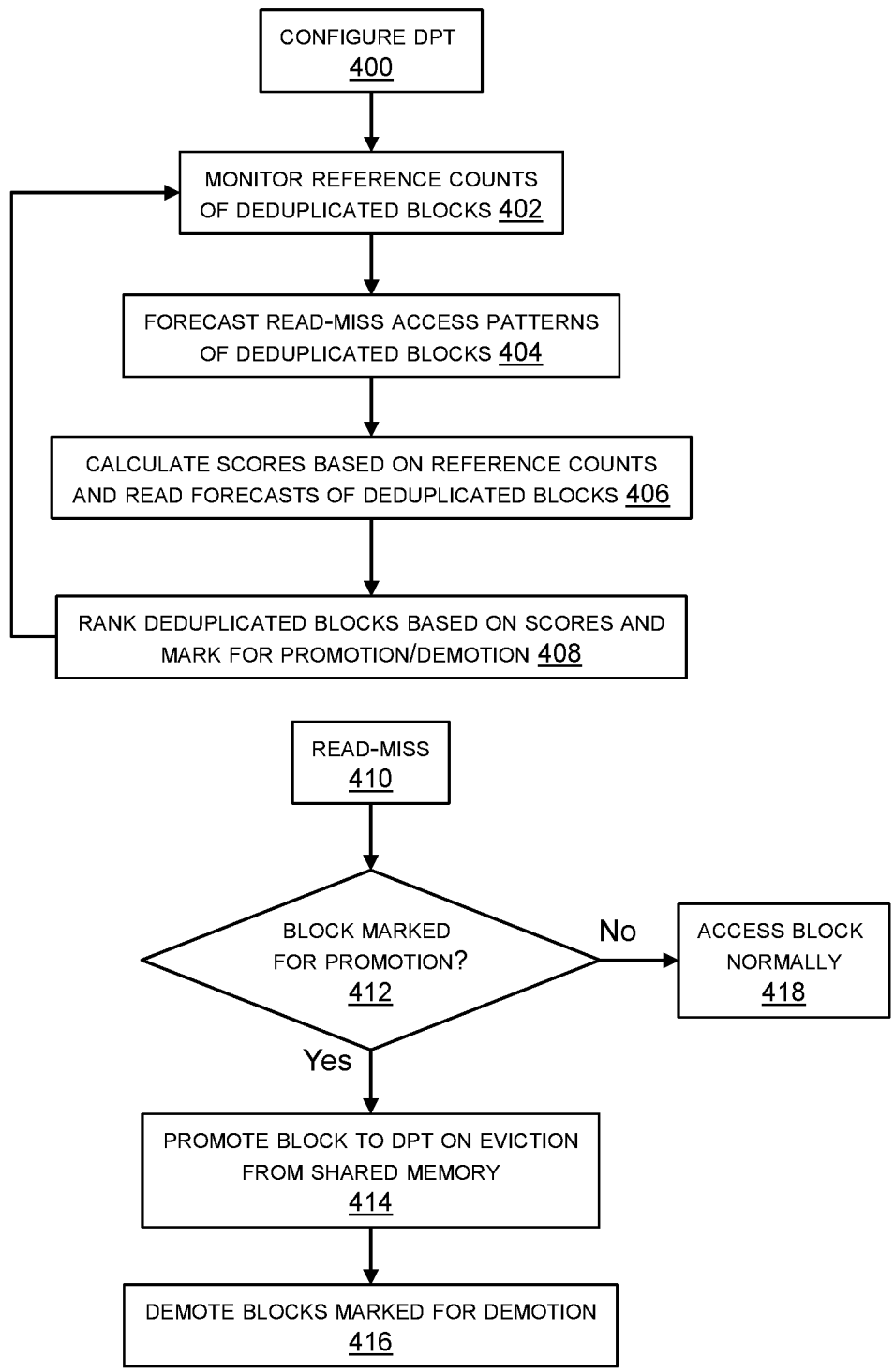
FIG. 4 illustrates a method for managing highly deduplicated data.

FIG. 4 illustrates a method for managing highly deduplicated data. Step 400 is configuring the DPT. A fixed amount of storage capacity or fixed percentage of the storage capacity of the storage array may be configured as the DPT. Individual drives corresponding to that storage capacity are allocated to the DPT, either as individual mirrors or as drives containing splits that are all available as mirror-storing members. The DPT storage capacity and/or drives may be evenly distributed across all engines of the storage array. The drives allocated to the DPT are configured for RAID-1 or RAID-1-like mirroring. Data deduplication processes running in the background identify duplicated blocks and the reference counts for those blocks are monitored as indicated in step 402. Read-miss access patterns of the deduplicated blocks are forecasted in step 404. The forecasts may be based on previous accesses and indicate which engines receive IOs to access particular blocks and how frequently those IOs are received. The duplicated blocks are scored algorithmically based on the reference counts and forecasted read-miss access patterns as indicated in step 406. For example, blocks with relatively greater reference counts and more frequent and widespread forecasted read-misses may be better candidates for promotion to the DPT. The scored deduplicated blocks are ranked based on the scores as indicated in step 408. Qualification for storage in the DPT may be based on an absolute score threshold or being one of the top scoring blocks corresponding to the capacity of the DPT. Blocks that are not currently in the DPT and satisfy the qualification are marked for promotion to the DPT. Blocks that are currently in the DPT and no longer satisfy the qualification are marked for demotion from the DPT. Steps 402 through 408 are iterated continuously so the set of blocks that qualifies for storage on the DPT is dynamically updated.

Blocks marked for promotion are lazily promoted in parallel with steps 402 through 408. In response to a read-miss 410, it is determined whether the corresponding block is a deduplicated block marked for promotion as indicated in step 412. If the block is marked for promotion to the DPT, then the block is accessed normally from the non-DPT tier and promoted to the DPT upon eviction from the shared memory as indicated in step 414. Recycling threads running on the compute node processors continuously free data slots to make space available for servicing new IOs. In general, blocks are evicted from shared memory based on how recently the corresponding tracks were accessed relative to other tracks in shared memory. The least recently accessed tracks are selected for eviction from shared memory. Tracks that are selected and contain blocks marked for promotion to the DPT are destaged to the DPT drives. Specifically, mirror copies of the blocks of data are written to the DPT drives on each engine such that each engine has a single local copy of the blocks in local storage. The corresponding tracks on the drives of the non-DPT tier from which the blocks are being promoted may be maintained. Blocks that are marked for demotion are demoted from the DPT to the non-DPT tier as indicated in step 416 to free space for promoted blocks. Blocks are demoted by marking the tracks as free in the DPT tier. If the accessed block is not marked for promotion as determined in step 412, then the block is accessed normally as indicated in step 418.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
configuring a portion of storage capacity of each of a plurality of storage engines as a dedupe performance tier;
identifying highly deduplicated blocks of data according to predetermined criteria; and
storing copies of the highly deduplicated blocks of data on the dedupe performance tier of each of the plurality of storage engines.

2. The method of claim 1 further comprising monitoring reference counts of deduplicated blocks of data.

3. The method of claim 2 further comprising forecasting read-miss access patterns of the deduplicated blocks of data.

4. The method of claim 3 further comprising calculating a score for each of the deduplicated blocks of data as a function of the reference counts and forecasted read-miss access patterns.

5. The method of claim 4 further comprising calculating promotions of ones of the deduplicated blocks of data to the dedupe performance tier and demotions of other ones of the deduplicated blocks of data from the dedupe performance tier based on the scores.

6. The method of claim 5 further comprising lazily promoting deduplicated blocks of data marked for promotion in response to read-misses.

7. The method of claim 6 further comprising scanning for deduplicated blocks of data marked for demotion.

8. A non-transitory computer-readable storage medium storing instructions that when executed by compute nodes cause a data storage system to perform a method comprising:
configuring a portion of storage capacity of each of a plurality of storage engines as a dedupe performance tier;
identifying highly deduplicated blocks of data according to predetermined criteria; and
storing copies of the highly deduplicated blocks of data on the dedupe performance tier of each of the plurality of storage engines.

9. The non-transitory computer-readable storage medium of claim 8 in which the method further comprises monitoring reference counts of deduplicated blocks of data.

10. The non-transitory computer-readable storage medium of claim 9 in which the method further comprises forecasting read-miss access patterns of the deduplicated blocks of data.

11. The non-transitory computer-readable storage medium of claim 10 in which the method further comprises calculating a score for each of the deduplicated blocks of data as a function of the reference counts and forecasted read-miss access patterns.

12. The non-transitory computer-readable storage medium of claim 11 in which the method further comprises calculating promotions of ones of the deduplicated blocks of data to the dedupe performance tier and demotions of other ones of the deduplicated blocks of data from the dedupe performance tier based on the scores.

13. The non-transitory computer-readable storage medium of claim 12 in which the method further comprises lazily promoting deduplicated blocks of data marked for promotion in response to read-misses.

14. The non-transitory computer-readable storage medium of claim 13 in which the method further comprises scanning for deduplicated blocks of data marked for demotion.

15. An apparatus comprising:
a data storage system comprising a plurality of storage engines configured to allocate portions of storage capacity as a dedupe performance tier, identify highly deduplicated blocks of data according to predetermined criteria, and store copies of the highly deduplicated blocks of data on the dedupe performance tier of each of the plurality of storage engines.

16. The apparatus of claim 15 further comprising the storage engines configured to monitor reference counts of deduplicated blocks of data.

17. The apparatus of claim 16 further comprising the storage engines configured to forecast read-miss access patterns of the deduplicated blocks of data.

18. The apparatus of claim 17 further comprising the storage engines configured to calculate a score for each of the deduplicated blocks of data as a function of the reference counts and forecasted read-miss access patterns.

19. The apparatus of claim 18 further comprising the storage engines configured to calculate promotions of ones of the deduplicated blocks of data to the dedupe performance tier and demotions of other ones of the deduplicated blocks of data from the dedupe performance tier based on the scores.

20. The apparatus of claim 19 further comprising the storage engines configured to lazily promote deduplicated blocks of data marked for promotion in response to read-misses.

* * * * *